(12) United States Patent
Yang et al.

(10) Patent No.: US 7,660,313 B2
(45) Date of Patent: Feb. 9, 2010

(54) SUB-RATE TRANSMISSION METHOD FOR USER DATA SERVICES IN TRANSMISSION DEVICES OF A METROPOLITAN AREA NETWORK

(75) Inventors: Wu Yang, Shenzhen (CN); Qianfeng Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 628 days.

(21) Appl. No.: 11/113,411

(22) Filed: Apr. 22, 2005

(65) Prior Publication Data

US 2005/0190773 A1 Sep. 1, 2005

Related U.S. Application Data

(63) Continuation of application No. PCT/CN03/00897, filed on Oct. 24, 2003.

(30) Foreign Application Priority Data

Oct. 25, 2002 (CN) .................................. 02 1 47438

(51) Int. Cl.
*H04L 12/56* (2006.01)
(52) U.S. Cl. .................................. 370/395.53; 370/428
(58) Field of Classification Search ............... 370/395.5, 370/352, 389, 395.53, 256, 428, 539, 227, 370/395.1; 709/249
See application file for complete search history.

(56) References Cited

U.S. PATENT DOCUMENTS 6,085,238 A * 7/2000 Yuasa et al. ................. 709/223
6,526,052 B1 * 2/2003 Rijhsinghani et al. ....... 370/389

6,618,388 B2 * 9/2003 Yip et al. ..................... 370/401

(Continued)

FOREIGN PATENT DOCUMENTS

CN 1356806 A 7/2002

(Continued)

OTHER PUBLICATIONS

IEEE standard for local and metropolitan area networks—Virtual bridged local area networks- amendment 2: VLAN classification by protocol and port; May 31, 2001.*

(Continued)

*Primary Examiner*—Salman Ahmed (57) ABSTRACT

The present invention discloses a sub-rate transmission method for user data services in transmission devices of a Metropolitan Area Network (MAN). The method comprises the steps of: pre-configuring each transmission device to form forwarding table items representing corresponding relationship between self-defined tags and transmission lines; after receiving a user data frame, an original transmission device nesting a self-defined tag into the user data frame according to the forwarding table items to form a self-defined data frame, then transmitting the self-defined data frame; and after receiving the self-defined data frame, a terminal transmission device determining an output port for transferring the data frame by searching the forwarding table items with the nested self-defined tag, then deleting the nested self-defined tag and sending the original user data frame to the output port. The present invention, by nesting a self-defined tag, can greatly increase the number of Virtual Local Area Networks (VLANs) accommodated by a MAN as well as simplify the configuration of tags for user data to bring more convenience to users.

3 Claims, 4 Drawing Sheets

U.S. PATENT DOCUMENTS

| | | | |
|---|---|---|---|
| 6,850,495 B1* | 2/2005 | Baum et al. | 370/256 |
| 6,912,592 B2* | 6/2005 | Yip | 709/249 |
| 6,944,159 B1* | 9/2005 | Fotedar et al. | 370/392 |
| 7,042,848 B2* | 5/2006 | Santiago et al. | 370/253 |
| 7,092,389 B2* | 8/2006 | Chase et al. | 370/389 |
| 7,120,150 B2* | 10/2006 | Chase et al. | 370/395.1 |
| 7,130,303 B2* | 10/2006 | Hadzic | 370/389 |
| 7,292,581 B2* | 11/2007 | Finn | 370/395.53 |
| 7,415,016 B1* | 8/2008 | Yip et al. | 370/392 |
| 2002/0071389 A1 | 6/2002 | Seo | |
| 2002/0089992 A1* | 7/2002 | Yip et al. | 370/401 |
| 2002/0091795 A1* | 7/2002 | Yip | 709/218 |
| 2002/0097730 A1* | 7/2002 | Langille et al. | 370/401 |
| 2002/0101870 A1* | 8/2002 | Chase et al. | 370/389 |
| 2002/0131414 A1* | 9/2002 | Hadzic | 370/393 |
| 2002/0176450 A1* | 11/2002 | Kong et al. | 370/539 |
| 2003/0174706 A1* | 9/2003 | Shankar et al. | 370/393 |
| 2003/0189898 A1* | 10/2003 | Frick et al. | 370/227 |
| 2003/0210696 A1* | 11/2003 | Goldflam | 370/395.1 |
| 2004/0081171 A1* | 4/2004 | Finn | 370/395.53 |
| 2004/0202157 A1* | 10/2004 | Chase et al. | 370/389 |
| 2004/0202171 A1* | 10/2004 | Hama | 370/395.1 |
| 2005/0138149 A1* | 6/2005 | Bhatia | 709/220 |
| 2005/0190773 A1* | 9/2005 | Yang et al. | 370/395.53 |
| 2006/0034292 A1* | 2/2006 | Wakayama et al. | 370/395.5 |
| 2006/0190627 A1* | 8/2006 | Wu et al. | 709/249 |

FOREIGN PATENT DOCUMENTS

WO    WO 9904595 A    1/1999

OTHER PUBLICATIONS

IEEE standards for local and metropolitan area networks: virtual bridged local area networks; Mar. 8, 1999.*

(Amendment to IEEE Std 802.1Q, 1998 Edition) IEEE Standards Amendment to IEEE 802.1Q: IEEE Standards for Local and Metropolitan Area Networks: Virtual Bridged Local Area Networks—Amendment 2: VLAN Classification by Protocol and Port (Incorporated into 802.1Q-2003) 2000.*

Carrier-grade Ethernet: extending Ethernet into next generation metro networks; Van de Voorde, L Tancevski, G Chiruvolu, . . . —Alcatel Telecommunications Review, 2002.*

Canadian Office Action for Canadian Application No. 2,505,004, dated May 12, 2009.

* cited by examiner

SUB-RATE TRANSMISSION METHOD FOR USER DATA SERVICES IN TRANSMISSION DEVICES OF A METROPOLITAN AREA NETWORK

CROSS-REFERENCE TO RELATED APPLICATIONS

This application is a continuation of International Application No. PCT/CN2003/000897 filed on Oct. 24, 2003. This application claims the benefit of Chinese Patent Application No. 02147438.9 filed on Oct. 25, 2002. The disclosures of the above applications are incorporated herein by reference.

FIELD OF THE INVENTION

The present invention relates to data transmission in a Metropolitan Area Network (MAN), and more particularly, to a sub-rate transmission method for user data services in transmission devices of a MAN.

BACKGROUND OF THE INVENTION

In a MAN, a user normally leases bandwidth based on transmission rate of Synchronous Digital Hierarchy (SDH), i.e., bandwidth level of the Virtual Channel-Trunk (VC-TRUNCK) on the MAN transmission device channel side. For example, at present the bandwidth leasable to users is categorized into the levels of VC-12, VC-3 and VC-4, among which the bandwidth value of VC-12, 2.048 Mbps, is the smallest one. If a user desires a bandwidth less than 2.048 Mbps, he has yet to lease a bandwidth of VC-12 alone since this is already the smallest leasable bandwidth for users, resulting in waste of system resources. Similarly, if the desired bandwidth level is between VC-12 and VC-4, the user may either lease a VC-4, resulting in waste of system resources as well because the desired bandwidth level is less than VC-4; or lease more than one VC-12, which will also lead to waste of system resources because, when the desired bandwidth can not be divided exactly by 2.048 Mbps, there must be a VC-12 providing more capacity than the requirement of the user.

Figure 1:
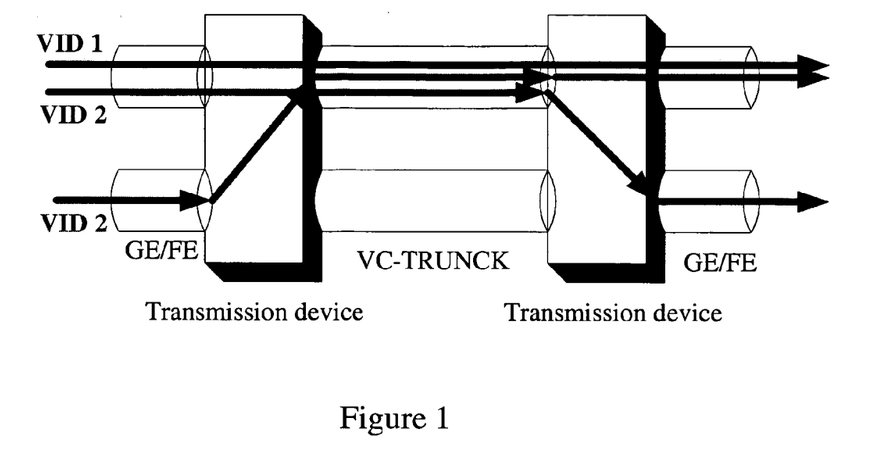
FIG. 1 is a schematic diagram showing user data transmission between MAN transmission devices by way of sub-rate transmission.

To avoid waste of resources caused in the above situations and make more effective use of the bandwidth capacity of a MAN, a sub-rate transmission method for data services has so far been proposed. With this method, as shown in FIG. 1, Ethernet data packets from different input ports can be transmitted through one same VC-TRUNCK, then separated at the terminal transmission device and transmitted to respective output ports. The Ethernet data packets herein are also called data frames. In this way, data of different users can be transmitted through the same VC-TRUNCK, thus effectively avoiding waste of resources and improving utilization of bandwidth.

To differentiate the data which are transmitted through the same VC-TRUNCK but come from different input ports and to forward them to respective output ports, each data frame is identified in the prior sub-rate transmission method. Specifically speaking, by taking use of IEEE (International Electric and Electronic Engineering) standard 802.1 P/Q, the whole MAN is divided into a plurality of Virtual Local Area Networks (VLANs) among which mutual access is disablement, and each user is assigned with one or more VLANs. In this way, data frames in the same VC-TRUNCK can be differentiated according to the VLAN Identifier (VLAN ID) which is unique in the entire MAN. And the terminal transmission device, by referring to the pre-stored corresponding relationship between the VLAN IDs and output ports, is able to determine the output port for each of the data frames transmitted through the same VC-TRUNCK so that the data frames can be transferred correctly to their respective output ports. Obviously, it is possible to incorporate the priority defined in the IEEE Standard 802.1 P and assign different priorities for VLANs so as to realize Quality of Service (QoS) to a certain extent.

Figure 2:
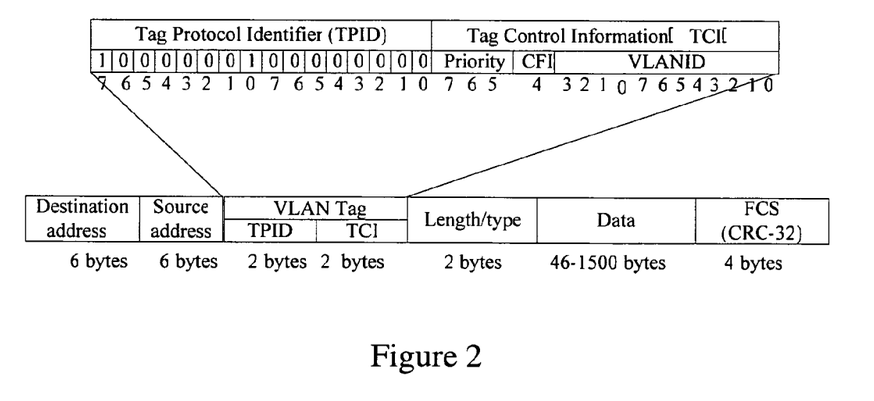
FIG. 2 shows a format of an Ethernet data frame according to the prior art.

FIG. 2 shows an Ethernet data frame format with VLAN ID conforming to IEEE 802.1 Q. As shown in FIG. 2, a data frame is composed of a destination address field, a source address field, a 802.1 Q header label field, a length/type field, a data field and a check field. Among them, the 802.1 Q header label field includes a Tag Protocol Identifier (TPID) and Tag Control Information (TCI), the combination of which is called a VLAN Tag, with VLAN ID being a component of TCI. At present, the VLAN ID defined in IEEE 802.1 Q has only 12 bits, so that at most $2^{12}$ VLANs, i.e., 4096 VLANs, can be accommodated in a whole MAN. With the expansion of the MAN, it is obvious that 4096 VLANs can not satisfy the service demand, thus restricting the development of the MAN. In addition, since the assignment of VLAN ID for each user must be made by unified planning within the whole MAN, the operation is rather complicated, bringing inconvenience to users.

SUMMARY OF THE INVENTION

In view of the above, it is an object of the present invention to provide a sub-rate transmission method for user data services in transmission devices of a MAN. With this method, the MAN is capable of accommodating more VLANs and assigning VLAN IDs unrestrictedly, thus facilitating further development of MAN as well as bringing more convenience to users.

For the above purpose, a method of sub-rate transmission for user data services in transmission devices of a MAN according to the present invention comprises:

a. pre-configuring each transmission device to form forwarding table items representing corresponding relationship between self-defined tags and transmission lines;

b. after receiving a user data frame, an original transmission device nesting a self-defined tag into the user data frame according to said forwarding table items to form a self-defined data frame, then transmitting the self-defined data frame; and c. after receiving the self-defined data frame, a terminal transmission device determining an output port for transferring the data frame by searching the forwarding table items with the nested self-defined tag, then deleting the nested self-defined tag and sending the original user data frame to the said output port.

In this method, the format of the self-defined tag may be the same as that of the VLAN Tag in the user data frame.

In this method, the self-defined tag may be a Virtual Channel Line (VCLine) tag comprising at least a VCLine ID. The VCLine tag may further comprise a field representing the type of the VCLine. The length of the VCLine ID may be a self-defined value.

In this method, the self-defined tag may be a tag complying with the definition of the Multi Protocol Label Swap (MPLS) protocol.

The self-defined tag may adopt a local variable, in this case the configuration of transmission devices in step a is implemented when it is determined that more than one data frame is to be transferred in one same virtual channel. Alternatively, the self-defined tag adopts a global variable, in this case the configuration of transmission devices in step a is implemented when a virtual channel is assigned.

The self-defined tag is located either before or after the original VLAN tag in the data frame.

It can be seen from the technical schemes of the present invention, a self-defined tag is nested in a user data frame, adopting either a global variable with more bits or a local variable which can be readily changed from node to node, so that more VLANs than 4096 as in the prior art can be accommodated, promoting greatly the application of the MAN and reducing the cost by increasing the user data services it accommodates.

In addition, with a self-defined tag nested, the VLAN identifier in the user data frame is not necessarily unique, accordingly the safe isolation of user data is simplified and convenience brought to the user's operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention will be described in detail hereinafter with reference to the accompanying drawings.

Figure 3:
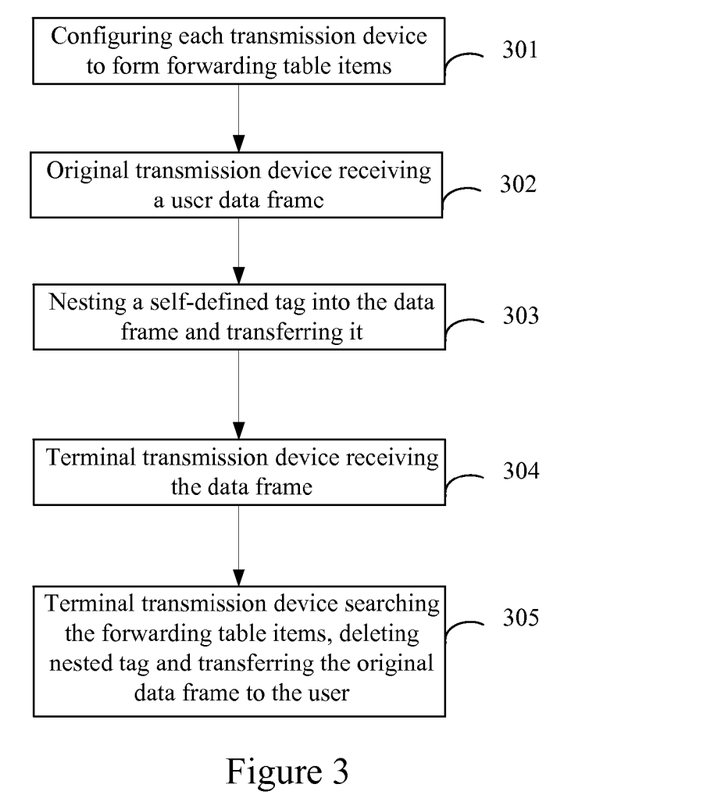
FIG. 3 is a flow chart showing general processing according to the present invention.

In the present invention, in order to support more VLANs than 4096 as in the prior art, besides the original VLAN ID, a self-defined tag is nested into a data frame, forming a self-defined data frame to differentiate more different VLANs. FIG. 3 shows the general processing flow of the present invention. A detailed description of this invention will be given below with reference to FIG. 3.

In step 301, each transmission device receives items of a forwarding table and updates the pre-stored forwarding table according to the received items. The items of the forwarding table may be configured and issued by a network administrator either at the time when multiple user data frames pass through VC-TRUNCK between transmission devices or at the time the user leases a line.

It should be noted that a forwarding table representing the corresponding relationship between self-defined tags and transmission lines is pre-stored in each transmission device of the MAN. For the original transmission device of a whole transmission line, this forwarding table is used to establish a self-defined tag of a data frame according to the input port number and the VLAN ID of the data frame, i.e., to establish a self-defined tag according to transmission line through which the data frame will pass. For an intermediate transmission device, this forwarding table is used to determine the next channel according to the self-defined tag. And for the terminal transmission device, this forwarding table is used to determine an output port according to the self-defined tag. The said original transmission device, intermediate transmission device and terminal transmission device are all concerned with the whole transmission line through which the data frame passes during the transmission. Operations like adding and modifying table items can be performed to this forwarding table.

In step 302, the original transmission device receives a user data frame through GE/FE ports.

In step 303, after receiving the user data frame, the original transmission device sets a self-defined tag mode according to the demand for service, then nests a corresponding self-defined tag into the user data frame by means of hardware, software, or combination of hardware and software, forming a self-defined data frame. After that this self-defined data frame is transmitted to a terminal transmission device through a VC-TRUNCK. The specific way of nesting a tag is known to those skilled in the art and will not be further described here.

In step 304, the terminal transmission device receives via its GE/FE port the self-defined data frame transmitted in step 303.

In step 305, after receiving the self-defined data frame, the terminal transmission device extracts the nested tag from the self-defined data frame and searches the items of the forwarding table with reference to the information in the extracted tag, then it deletes the nested tag and transmits the data frame to the output port corresponding to the user according to the items of the forwarding table, thus sending the data frame to the user correctly.

The self-defined tag mode mentioned in step 303 will be described hereinafter in detail with reference to three embodiments.

Figure 4:
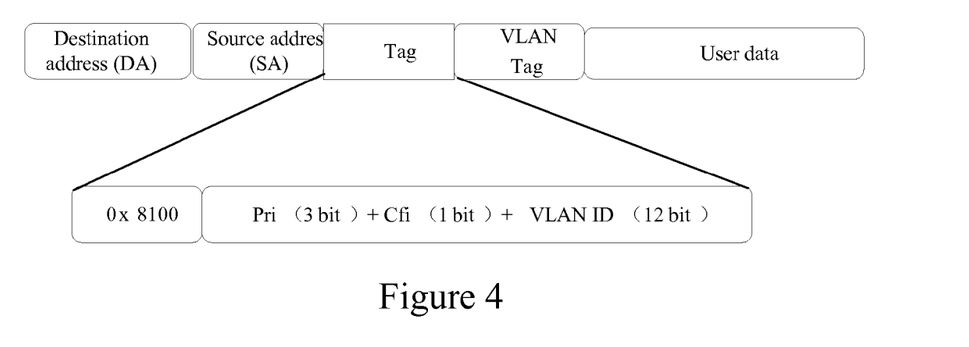
FIG. 4 shows a tag-nesting mode according to a first embodiment of the present invention.

FIG. 4 shows a tag-nesting mode according to the first embodiment of the present invention. In this embodiment as shown in FIG. 4, the nested self-defined tag is a VLAN tag. That is, a self-defined tag defined completely the same as the original VLAN Tag is added before the VLAN Tag in FIG. 2. Therefore, in case of sub-rate transmission of user data service, the nested self-defined tag can be used to differentiate data frames with the same VLAN Tag. In this mode, the self-defined tag may be a local variable, that is, there may be different self-defined tags between different nodes between two transmission devices and it is not required that the self-defined tag remains the same during the whole transmission process. This is because the same problem will arise that no enough VLANs can be supported if the self-defined tag remains the same during the whole transmission process since there are only 12 bits assigned for the nested self-defined tag as well. For intermediate transmission devices, it is the only requirement that different data frames can be differentiated with nested self-defined tags. By flexibly configuring self-defined tags between different nodes, this embodiment is able to accommodate more VLANs compared with the prior art so long as data frames transferred between two same nodes have different self-defined tags.

In terms of self-defined tags nested in this mode, the specific transmission process is as follows. When there are a plurality of data frames being transmitted through the same VC-TRUNCK, a nested field of VLAN ID will be configured by the network administrator in order to differentiate different user data services and the forwarding table items are issued to all the transmission devices. MAN transmission devices, after receiving user data frames and determining that it is a sub-rate transmission of user data service, nest the self-defined tags of the same format as that of the original VLAN tag and transfer the data according to the forwarding table. The terminal transmission device, after receiving the data frame with a nested tag, deletes the nested self-defined tag and transfers the user data frame to the user according to the corresponding relationship between self-defined tags and output ports. In this VLAN-nesting mode of the first embodiment, the forwarding channel is searched by means of "Port+VLAN+nested VLAN". The nested VLAN herein is a local variable, and it constitutes a designation address of the user data frame together with "VLAN" and "Port". Therefore, the VLAN ID in the user data frame is not necessarily unique throughout the whole network, it is only required that a nested VLAN ID is assigned for use in transmission between two nodes of the transmission devices.

Figure 5:
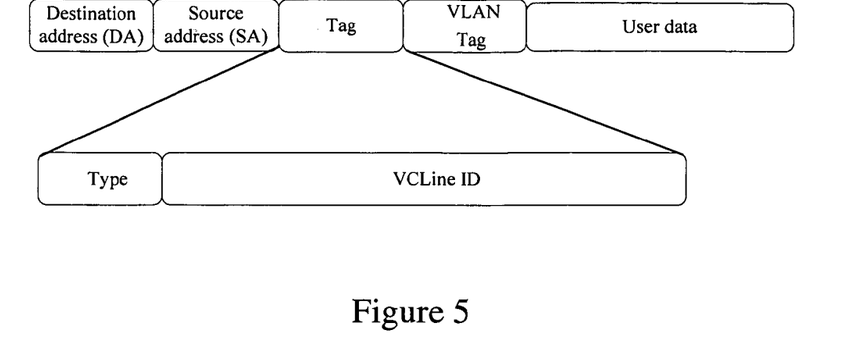
FIG. 5 shows a tag-nesting mode according to a second embodiment of the present invention.

FIG. 5 shows a tag-nesting mode according to the second embodiment of the present invention. In this embodiment as shown in FIG. 5, the nested self-defined tag is a Virtual Channel Line (VCLine) tag. That is, a self-defined VCLine tag adopting a global variable is added before the VLAN Tag in FIG. 2.

As shown in FIG. 5, in the second embodiment, the tag nested before the 802.1 Q tag comprises a VCLine ID field and a type field. When a user leases a line from the service provider, the service provider will assign a VCLine ID to the user every time a line is set for him, and the user can define by himself the length of the VCLine ID. In addition, the type field is a field not used by IEEE and can be employed by the equipment manufacturer, so it may be used here for representing the type of the VCLine. Since the user can define by himself the length of VCLine ID as of more than 12 bits in this mode, more VLANs can be readily accommodated.

In terms of the tag-nesting mode shown in FIG. 5, the transmission process is as follows. During the process of configuring the transmission line that the user has leased from the service provider, the network administrator issues a VCLine ID directly to the items of forwarding tables of all transmission devices. The original transmission device in the MAN, after receiving the 802.1 Q VLAN data frames of the user, adds nested VLAN Tag into the data frames no matter whether there is a sub-rate transmission of user data services. The terminal transmission device, after receiving the data with the VCLine ID, deletes the VCLine ID and transfers the 802.1 Q data frames to the user. Compared with the mode of searching the forwarding channel by means of "Port+VLAN+nested VLAN" in the first embodiment, the second embodiment is of high transferring efficiency because only VCLine ID is involved for the search. In addition, since VCLine is a global variable and the user can define its length by himself, there is no restriction to the amount of user data services it accommodates.

Figure 6:
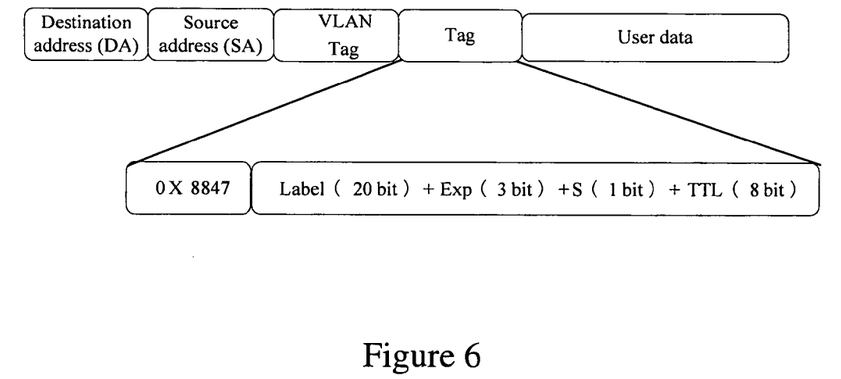
FIG. 6 shows a tag-nesting mode according to a third embodiment of the present invention.
Figure 7:
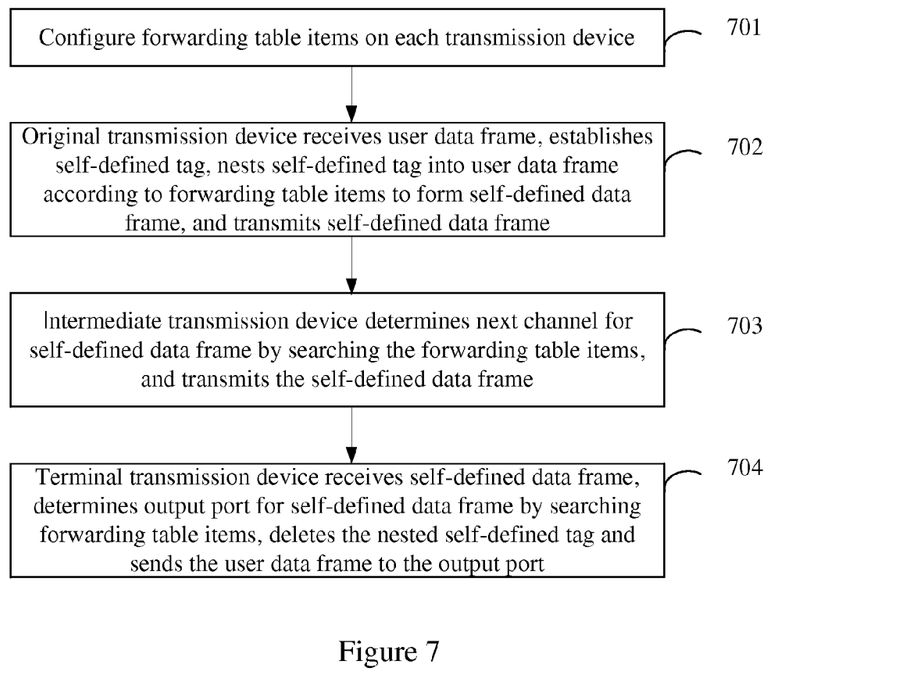
FIG. 7 is a flow chart showing a method of sub-rate transmission for user data services in transmission devices of a MAN according to an embodiment of the present invention.

FIG. 6 shows a tag-nesting mode according to the third embodiment of the present invention. In this embodiment as shown in FIG. 6, the nested self-defined tag is a Multi Protocol Label Swap (MPLS) tag, that is, a MPLS tag adopting a local variable is nested after the VLAN Tag in FIG. 2.

As shown in FIG. 6, the MPLS tag complies with the definition of the MPLS protocol, in which the Label field is equivalent to the VLAN ID in the first embodiment, but different from the first embodiment in that the Label field is 20-bit, thus more VLANa can be accommodated.

In terms of the tag-nesting mode shown in FIG. 6, the transmission process is as follows. When there are a plurality of user data frames being transferred through the same VC-TRUNCK, the network administrator assigns MPLS Labels to differentiate different user data services and issues forwarding table items to each transmission device. The transmission devices in the MAN, after receiving the user data frames, add nested MPLS tags into the frames. The terminal transmission device, after receiving the data frames with nested MPLS tags, deletes the nested MPLS tags and transfers the data frames to the user. In this mode of nesting MPLS tags according to the third embodiment, the forwarding table items are searched according to the Label field in the MPLS tag. The forwarding table items are in static configuration and support user data service packets of the MPLS type.

Obviously, the self-defined tag in the third embodiment may adopt a global variable as well. In this case, the self-defined tag can be configured and corresponding table items issued to all transmission devices at the time when a user leases a transmission line from the service provider.

In addition, the self-defined tags can be nested to different positions of the original data frames. For instance, in the first embodiment the self-defined tag can be placed after the original VLAN Tag. And the self-defined tags in the second embodiment may adopt a local variable as well.

The self-defined tag according to the present invention is not limited to the above-mentioned formats in these three embodiments, instead other formats complying with other communication protocols can be adopted also. Thus it should be understood that the embodiments described herein are to be regarded as illustrative rather than restrictive. Variations and changes may be made by those skilled in the art and equivalents employed, without departing from the spirit of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of sub-rate transmission for user data services in transmission devices of a Metropolitan Area Network (MAN), comprising:
   a. pre-configuring, on each transmission device, forwarding table items representing corresponding relationship between self-defined tags and transmission lines when it is determined that data frames from a plurality of Virtual Local Area Networks (VLANs) are to be transferred in one virtual channel of the MAN, wherein the self-defined tags adopt local variable;
   b1. receiving, at an original transmission device, respectively from first and second VLANs a first user data frame having a Virtual Local Area Network (VLAN) Tag and a second user data frame having a second VLAN tag;
   b2. establishing, at the original transmission device and according to the forwarding table items of that device, first and second self-defined tags and assigning the first and second self-defined tags to the first and second VLANs respectively, wherein each of the first and second self-defined tags and a respective one of the first and second VLAN Tags collectively identify a respective one of the first and second VLANs;

b3. nesting the first and second self-defined tags into the first and second user data frames to form first and second self-defined data frames respectively, transmitting the first and second self-defined data frames in a same one virtual channel; and c. determining, by an intermediate transmission device, a next channel for transferring the first self-defined data frame by searching the forwarding table items of the intermediate transmission device with the first nested self-defined tag and the first VLAN tag both obtained from the first self-defined data frame, and transmitting the first self-defined data frame through the next channel; and d. after receiving the first self-defined data frame, determining, by a terminal transmission device, an output port for transferring the first self-defined data frame by searching the forwarding table items with the first nested self-defined tag, then deleting the first nested self-defined tag and sending the first user data frame to the output port.

2. The method of claim 1, wherein the first and second VLANs are two of N VLANs connected to the MAN, N being an integer greater than 4096;

the method further comprising assigning a plurality of self-defined tags including the first and second self-defined tags, at the original transmission device, to user frames from the N VLANs such that the VLAN of each of the user frames is uniquely identified within the N VLANs by a combination of a VLAN tag and the assigned self-defined tag both of that user frame, the VLAN tag being in accordance with IEEE 802.1 P/Q standard.

3. The method of claim 1, wherein the original transmission device, the intermediate transmission device, and the terminal transmission device all support Synchronous Digital Hierarchy (SDH) protocol.

* * * * *

UNITED STATES PATENT AND TRADEMARK OFFICE
CERTIFICATE OF CORRECTION

PATENT NO.        : 7,660,313 B2                                              Page 1 of 1
APPLICATION NO.   : 11/113411
DATED             : February 9, 2010
INVENTOR(S)       : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 850 days.

Signed and Sealed this

Twenty-eighth Day of December, 2010

David J. Kappos
*Director of the United States Patent and Trademark Office*